United States Patent [19]

Schwerin

[11] 3,835,966
[45] Sept. 17, 1974

[54] BRAKING ARRANGEMENT

[75] Inventor: Gunther Schwerin, Moglingen, Germany

[73] Assignee: Robert Bosch GmbH, Stuttgart, Germany

[22] Filed: June 19, 1973

[21] Appl. No.: 371,565

[30] Foreign Application Priority Data
July 1, 1972   Germany............................ 2232373

[52] U.S. Cl. ................ 188/106 F, 188/3 R, 74/478
[51] Int. Cl............................................. F16d 63/00
[58] Field of Search ......... 188/106 F, 106 P, 106 R, 188/3 R, 16, 354; 74/478, 480 R, 512

[56] References Cited
UNITED STATES PATENTS

| | | | |
|---|---|---|---|
| 1,584,358 | 5/1926 | Dement........................... | 188/106 R |
| 2,516,229 | 6/1950 | Majneri............................ | 188/16 |
| 3,441,108 | 4/1969 | Boueil et al...................... | 188/3 R |

Primary Examiner—Trygve M. Blix
Assistant Examiner—Sherman D. Basinger
Attorney, Agent, or Firm—Michael S. Striker

[57] ABSTRACT

A mechanical braking system is provided in a motor vehicle and a hydraulic braking system is provided in a trailer for the motor vehicle. A pair of separately journalled brake pedals are provided in the motor vehicle, and linkage rods connect each of the brake pedals with a component of the mechanical braking system. A coupling arrangement is movable between a first position in which it enforces joint movement of the brake pedals, and a second position in which it permits individual movements thereof. A second connecting arrangement connects the brake pedals with the hydraulic braking system only when the coupling arrangement is in its first position.

13 Claims, 5 Drawing Figures

PATENTED SEP 17 1974  3,835,966

3,835,966

BRAKING ARRANGEMENT

BACKGROUND OF THE INVENTION

The present invention relates generally to braking arrangements, and more particularly to an arrangement for permitting the selective operation of this mechanical braking system of a motor vehicle, and of the mechanical braking system as well as of the hydraulic braking system of a trailer of the motor vehicle.

It is known from the prior art to provide a motor vehicle with two braking pedals each of which can operate a part of the mechanical braking system of the motor vehicle which is associated with a particular wheel or set of wheels of the vehicle. If the vehicle is provided with a trailer having a hydraulic braking system which is actuated from the motor vehicle itself, then the two brake pedals are coupled by means of a loosely mounted rod which is provided at the free ends of the brake pedals so that they will be operated in unison. When so operated, they actuate not only the mechanical braking system of the vehicle, but also the hydraulic braking system of the trailer.

However, this arrangement has certain disadvantages. One of these is that the rod is difficult to install and service because of poor access conditions. More importantly, however, the construction involves the provision of a valve for operation of the hydraulic braking system at the free end of one of the brake pedals and of course the valve must be connected with conduits which in turn are communicated with the hydraulic braking system of the trailer. This results in an expensive and rather complicated construction which evidently is subject to multiple breakdown possibilities. Furthermore, the relationship of force transmission will always be the same, whether the motor vehicle alone is to be braked or whether the motor vehicle is to be braked when it has a trailer connected to it. In the latter case, moreover, the operator must not step on both of the brake pedals, but only on one of them because only in this manner will the valve associated with this particular brake pedal be operated. Deformations in the connecting rod or changes in the play thereof can result in uneven braking, and in addition, there is the fact that no possibility exists of operating the brake pedals individually when only the vehicle itself is to be braked since no account can be taken of the fact that the brakes of the various wheels or sets of wheels will wear unevenly, an uneven braking effect is usually obtained in any case.

SUMMARY OF THE INVENTION

It is, accordingly, a general object of the present invention to overcome the disadvantages of the prior art.

More particularly, it is an object of the invention to provide an improved braking arrangement which is of very simple construction and operation.

An additional object of the invention is to provide such an improved braking arrangement which permits a particularly simple and reliable change-over from braking of the motor vehicle alone to braking of the motor vehicle with the attached trailer, and vice versa.

In keeping with the above objects and others which will become apparent hereafter, one feature of the invention resides in a braking arrangement which, briefly stated, comprises a mechanical braking system of a motor vehicle and a hydraulic braking system of a trailer of the motor vehicle. A pair of separately journalled brake pedals are provided and first connecting means connects each of the brake pedals with the mechanical braking system. Coupling means is movable between a first position in which it enforces joint movement of the brake pedals and a second position in which it permits individual movement thereof. Second connecting means connects the brake pedals with the hydraulic braking system only when the coupling means is in its first position.

This construction is very simple as will be readily understood, and can without any difficulty be adjusted for braking of the motor vehicle itself or for braking of the motor vehicle as well as a trailer connected with the same. No additional components are required for change-over between the different types of braking operations, nor are any tools needed.

Moreover, it is immaterial whether the operator depresses one of the pedals, the other of the pedals or even both of them when he seeks to brake the motor vehicle with the trailer attached thereto.

The construction according to the present invention is also rather small in its dimension and can therefore be particularly readily used in existing installations, that is in motor vehicles where a mechanical braking system is already present.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
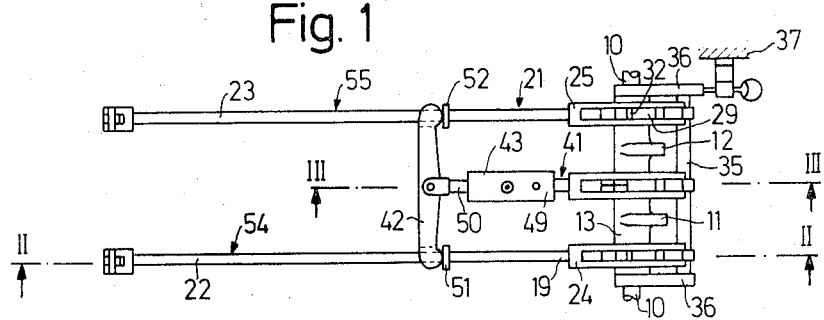
FIG. 1 is a plan view illustrating a portion of a braking arrangement according to the present invention in one position.

Discussing the drawing in detail it will be seen that FIGS. 1, 2, 3 and 4 show a shaft 10 which should be understood to be mounted in a motor vehicle. Journalled turnably by means of hubs 13 and 14 on this shaft 10 are two separately operable brake pedals 11 and 12. The hub 13 is provided with a first projection 15 rigid therewith, and similarly the hub 14 is provided with a projection 16 which is also rigid with it. Both of these projections extend upwardly approximately in the direction towards the brake pedals. In addition, the adjacent ends of the hubs 13, 14 are each provided with a second projection 17, 18, respectively, which extend in the same direction.

A connecting or transmitting member 19 is associated with the projection 15 and a similar member 21 is associated with the projection 16. The member 19 comprises a linkage rod 22 having a bifurcated end portion 24 and the member 21 comprises a similar linkage rod 23 having a bifurcated end portion 25. The rods 22 and 23 are pivoted to an angular lever 26 which is journalled in a fixed portion of the motor vehicle (not shown), and the two levers 26 are connected via rods 27 with the brakes (not shown) of the motor vehicle.

Figure 2:
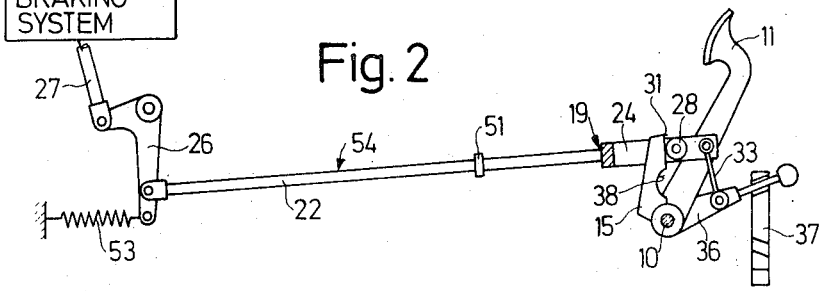
FIG. 2 is a section taken on line II—II of FIG. 1, showing the arrangement in another position.
Figure 3:
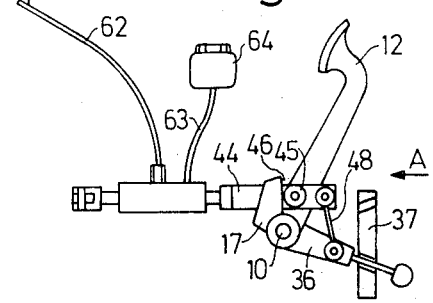
FIG. 3 is a section taken on line III—III of FIG. 1.
Figure 4:
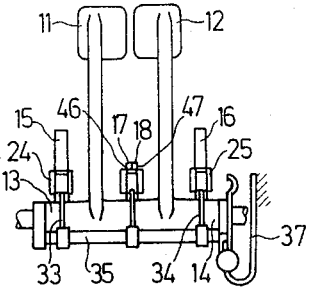
FIG. 4 is a side view as seen in the direction of A of FIG. 3.

Each of the bifurcated end portions 24, 25 is provided with a roller 28, 29, respectively, and these rollers contact engaging surfaces 31 and 32 of the projections 15, 16, when the members 19 and 21 are in the position shown in FIG. 2.

Rods 33 and 34 of the bifurcated end portions 24, 25 connect the latter with a rod 35 which extends parallel to the shaft 10 and is mounted pivotably about the latter by means of arms 36. Arresting means 37 is provided, being stationarily mounted on the motor vehicle, and is able to retain the arms 36 in the position shown in FIG. 2.

In the region between the contact faces 31, 32 and the hubs 13, 14 the projections 15, 16 are provided with respective semi-circular recesses 38. A second transmitting or connecting element 41 is located midway between the two members 19, 21 and comprises a lever 42 having two arms of equal length, a hydraulic unit 43 and a bifurcated portion 44, the latter having a roller 45 which contacts the contact faces 46, 47 of the projections 17, 18 when the members 19, 21 and 41 are in the position illustrated in FIGS. 1 and 3. The bifurcated end portion 44 is pivoted to the rod 35 by means of a rod 48, and is also rigidly connected with a housing 49 of the unit 43. The latter has a piston rod 50 which is pivoted to the lever 42 the ends of which have abutment portions 51 and 52 which contacts the rod 22, 23, respectively, to be supported thereon.

The ends of the arm 42 are so configurated that the arm 42 is movably guided between the rods 22, 23 and that cylindrical surfaces provided on these ends contact the portions 51, 52 and are supported thereby. It is shown in the drawing that the projections 17, 18 are shorter than the projections 15, 16. The reason for this is that in the position shown in FIG. 3, the members 19, 21 and 41 are substantially closer to the shaft 10. It will be appreciated that the arresting means 37 are capable of maintaining the arms 36 in either one of the two positions which these arms can assume.

Each of the angular levers 26 is connected with a tension spring 53 which maintains the mechanical brake linkages 54, 55 composed of the members 19, 21, 41, 26 and 28, in engagement with projections 15, 16 and 17, 18.

Figure 5:
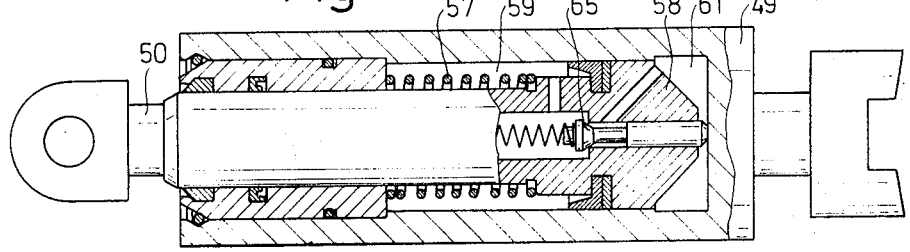
FIG. 5 is a section through a hydraulic unit used in the embodiment of FIGS. 1 – 4 on an enlarged scale.

The hydraulic unit 43 which is shown in FIG. 5 will be seen to have a piston rod 50 which is biassed by a spring 57 and carries a piston 58 which separates (in the interior of the housing 41 of the unit 43) a pressure chamber 59 from a reservoir chamber 61. A conduit 62 connects the chamber 59 with a brake valve interposed in the hydraulic braking system of the non-illustrated trailer, and a conduit 63 connects the chamber 61 with a reservoir or tank 64. The piston 58 is provided with a spring-loaded valve 65 which, depending upon the position of the piston 58 establishes a connection between the two chambers 59 and 61 but will disrupt this connection as soon as the piston 58 performs even a small movement. This serves as a compensation for fluid leakage.

The operation of the arrangement will already be evident from what has been set forth above. Assuming that the arms 36 are in the position shown in FIG. 2, to permit a braking operation in which the hydraulic braking system is not to be activated and in which the two brakes (each controlled by one of the pedals) of the mechanical braking system are to be either activated singly or together. It will be seen that the arms 36 are arrested in their first position by the arresting means 37. The springs 53 maintain the rollers 28, 29 on the bifurcated end portions 24, 25 in contact with the contact faces 31 and 32 of the projections 15, 16. In this position, the roller 45 will be spaced from the projections 17, 18. If, now, a force is exerted upon the pedal 11 in a sense depressing the same, then this force is transmitted via the projection 15 to the brake linkage 54 and via the same to one of the brakes of the mechanical braking system. Independently thereof, it is possible to simultaneously operate also the brake pedal 12 and to thereby transmit a braking force to the other brake of the mechanical braking system. Irrespective of whether only one or both of the brake pedals are operated, however, the two projections 17, 18 will not contact the roller 45 because they are so configurated that in the illustrated positions they will move past the roller 45.

Assuming, now, that a braking operation is selected in which both the mechanical braking system and the hydraulic braking system are to be operated, then the arms 36 are moved to their second position in which they are again arrested by the arresting means 37. In this position, the braking operation is such that both brakes of the mechanical braking system can only be operated jointly and also together with the hydraulic braking system of the trailer. When the arms 36 are moved to the position permitting this type of braking, the rods 33, 34 and 48 shift the members 19, 21 and 22 jointly in the direction towards the shaft 10 with the result that the projections 17, 18 now engage the roller 45. At the same time, the rollers 28, and 29 move in such a manner with respect to the recesses 38 that when the brakes are activated the first projections 15 and 16 cannot become active.

If, with the arrangement adjusted in this manner, a depressing force is exerted upon the brake pedal 11, then this force is transmitted by the projection 17 to the roller 45 and via the hydraulic unit 43 to the lever 42. The lever, whose arms are of equal length, evenly distributes the force to the rods 22, 23 so that both brakes of the mechanical braking system are uniformly actuated. It is particularly advantageous that this actuation is entirely independent of the degree of wear of the two separate brakes of the mechanical braking system. At the same time as the brake pedal 11 is depressed, a pressure is produced in the pressure chamber 49 of the hydraulic unit 43, which is proportional to the force with which the pedal 11 is depressed. This pressure is transmitted via the conduit 62 into a non-illustrated valve of the hydraulic braking system of the trailer, which valve then actuates the hydraulic braking system. Only a small amount of pressure medium is displaced during this operation from the pressure chamber 59 which in this condition is separated from the reservoir chamber 61 by the valve 65.

When the force is subsequently relaxed, the spring 57 pushes the piston 58 until it abuts the housing 49, and the valve 65 opens the connection between the chambers 59 and 61 so that any losses which have occurred in the pressure chamber 59 due to possible leakage can be automatically replaced by the entry of additional fluid from the tank 64. This fluid-leakage compensating arrangement requires only little space and does not disadvantageously affect the operation of the braking arrangement.

It will be appreciated that instead of the brake pedal 11, the brake pedal 12 can be depressed and that the operation will be identically the same as described above. Moreover, even if both brake pedals 11 and 12 are depressed simultaneously, the operation will still be the same as described above.

During braking which is intended to activate both the mechanical and the hydraulic braking systems, the distance between the shaft 10 and roller 45 is substantially less than the spacing between the shaft 10 and the rollers 28, and 29 when only the mechanical braking system is to be activated. This provides a particularly simple manner of compensating for the braking force in accordance with the different force required for the two types of braking operations.

It will be understood that each of the elements described above, or two or more together, may also find a useful application in other types of constructions differing from the types described above.

While the invention has been illustrated and described as embodied in a braking arrangement, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A braking arrangement, comprising a mechanical braking system of a motor vehicle; a hydraulic braking system of a trailer for said motor vehicle; a pair of separately movable brake pedals; first connecting means including a pair of first connecting elements connecting the respective brake pedals with said mechanical braking system and operative, upon movement of the respective brake pedal, for acting upon said mechanical braking system; coupling means movable between a first position in which it enforces joint movement of said first connecting elements, and a second position in which it permits individual movement thereof; and second connecting means connecting said brake pedals with said hydraulic braking system only when said coupling means is in said first position so that said hydraulic braking system is operated only when said coupling means is in said first position but not when said coupling means is in said second position.

2. An arrangement as defined in claim 1, wherein said pedals each comprise a first and a second projection, each movable between first and second orientations; said second connecting means comprising a connecting element associated with said first connecting means and being in operative engagement with said projections when the same are in one of said orientations.

3. An arrangement as defined in claim 2, wherein said second connecting element comprises a lever having two arms of equal length each connected with said first connecting means, and a hydraulic unit pivoted to said lever midway of the same and connected with said hydraulic braking system.

4. An arrangement as defined in claim 3, said hydraulic unit comprising a cylinder, a piston in said cylinder and defining a pressure chamber and a reservoir chamber, and a spring loaded valve in said piston and connecting said chambers in one of two positions of said piston.

5. An arrangement as defined in claim 2, said pedals being journalled on a common shaft; and wherein said connecting means have free ends which are located closer to said shaft in said first orientation than in said second orientation.

6. An arrangement as defined in claim 5; and further comprising actuating means mounted on said shaft and operatively associated with said connecting means.

7. An arrangement as defined in claim 6, wherein said actuating means comprises a bar journalled on said shaft and pivotable in parallelism therewith, said first and second connecting means comprising respective linkage rods connected with said bar, a lever connected with said bar for displacing the same between two positions, and arresting means for arresting said lever in said positions.

8. An arrangement as defined in claim 5, said brake pedals each having a hub turnably journalled on said shaft, said hubs each having adjacent ends provided with a respective second projection and wherein said second connecting element has a bifurcated portion into which said second projections engage.

9. An arrangement as defined in claim 8, wherein said first connecting means comprises two linkage rods each having a bifurcated end portion; and wherein said first projections are each provided on the respective hubs and each engage with one of said bifurcated end portions.

10. An arrangement as defined in claim 9, wherein said first projections have arcuate cam faces, and said bifurcated portion and bifurcated end portions each have rollers engageable with said cam tracks.

11. An arrangement as defined in claim 9, wherein said first projections each have a recess so arranged as to prevent operation of said first connecting means by said first projections when said coupling means is in said first position thereof.

12. An arrangement as defined in claim 9, wherein said second projections are configurated so as to prevent operation of said second connecting means by said second projections when said coupling means is in said second position thereof.

13. A braking arrangement, comprising a mechanical braking system of a motor vehicle; a hydraulic braking system of a trailer for said motor vehicle; a pair of separately movable brake pedals each including a projection movable between two orientations; first connecting means, including a pair of first connecting elements, connecting the respective brake pedals with said mechanical braking system and operative, upon movement of the respective brake pedal, for acting upon said mechanical braking system; coupling means movable between a first position in which it enforces joint movement of said first connecting elements, and a second position in which it permits individual movement thereof; second connecting means, including a connecting element associated with said first connecting means and in operative engagement with said projections when the same are in one of said orientations, said second connecting means connecting said brake pedals with said hydraulic braking system only when said coupling means is in said first position thereof.

* * * * *